Feb. 24, 1925.  
J. C. GOOSMANN  
1,527,584  
RATIO FLOW CONTROL VALVE  
Filed June 29, 1922
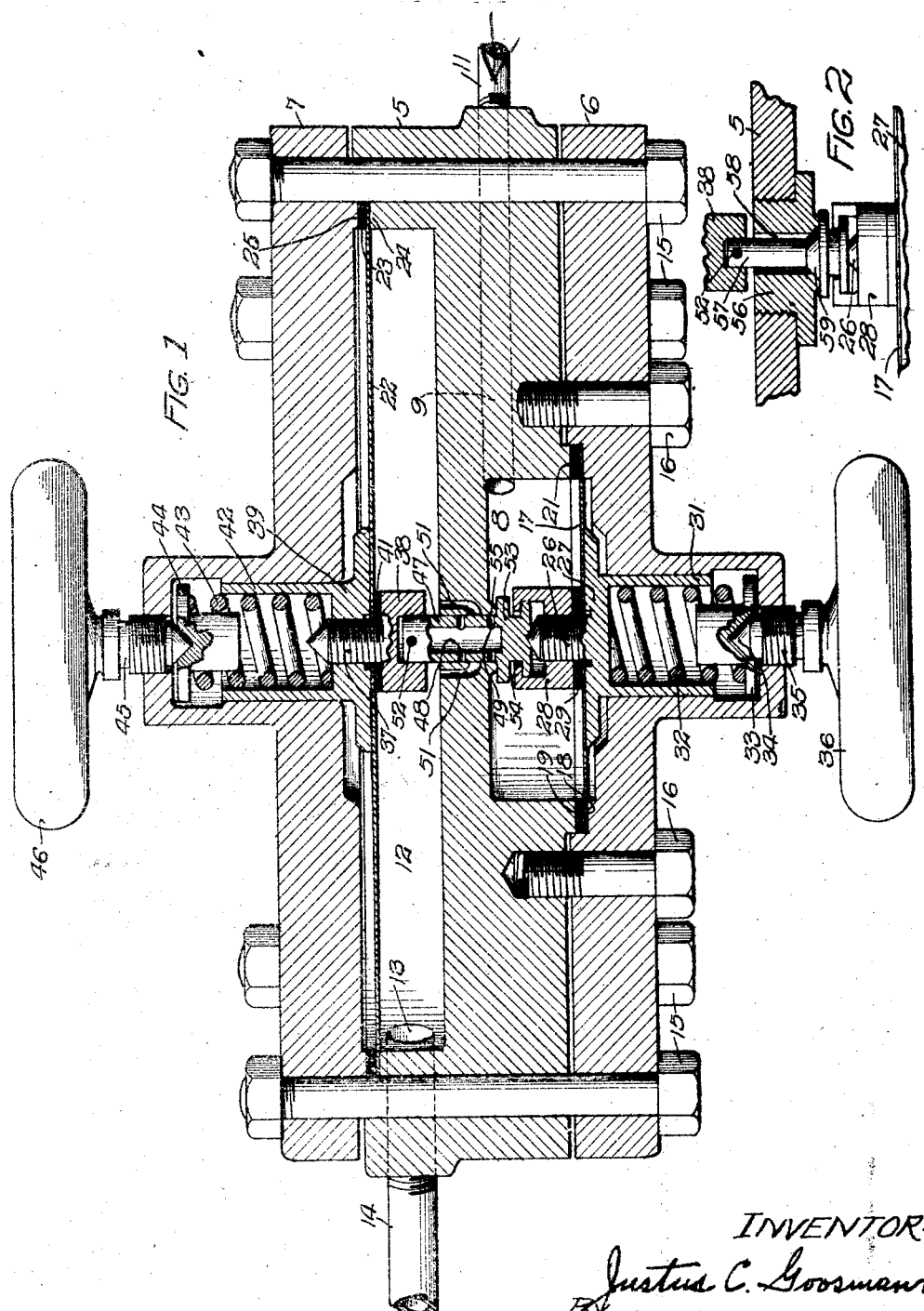
INVENTOR:  
Justus C. Goosmann  
Elsa J. Wilson  
ATTY Patented Feb. 24, 1925.

1,527,584

UNITED STATES PATENT OFFICE.

JUSTUS C. GOOSMANN, OF CHICAGO, ILLINOIS.

RATIO FLOW-CONTROL VALVE.

Application filed June 29, 1922. Serial No. 571,683.

*To all whom it may concern:*

Be it known that I, JUSTUS C. GOOSMANN, a citizen of the United States, residing at Chicago, in the county of Cook and State of Illinois, have invented certain new and useful Improvements in Ratio Flow-Control Valves, of which the following is a specification.

This invention, while relating in general to valves, pertains more particularly to ratio flow control valves adapted to maintain a predetermined ratio between the pressures on the opposite sides of the valve. The valve of my invention is capable of many uses, but is especially suitable for use as an expansion valve in refrigerating systems, and the principles thereof may be embodied in expansion valves for systems employing as the refrigerating medium ammonia, carbon dioxide, or other preferred mediums.

One of the features of my invention resides in the fact that no stuffing boxes are required, thus materially reducing the liability of leakage.

Another advantageous feature resides in the fact that the valve itself, as well as the controlling diaphragms, are firmly guided in their movements so that cramping and binding of these elements are obviated and thereby the delicacy and accuracy of the valve are maintained.

Another purpose of the invention is to provide a valve which is capable of adjustment from both sides so that its operation and the control of the medium flowing therethrough may be regulated to a fine degree of nicety.

Other objects and advantages of my invention should be readily appreciated as the same becomes better understood by reference to the following description when considered in connection with the accompanying drawings.

Referring to the drawings:

Fig. 1 is a sectional view through a valve embodying my invention; and

Fig. 2 is a fragmentary sectional view, showing a modified form of the valve.

The valve casing comprises a central section 5 and the two outer sections 6 and 7, which for convenience, will be referred to as the bottom and top respectively, although it should be understood that the invention may be used in inverted position, or may be disposed on edge, or in any other convenient position, since its operation is not dependent to any appreciable degree upon gravity.

The central section 5 is formed to provide the high pressure chamber 8 to which the high pressure fluid is delivered through a duct 9 from a supply pipe 11, and a low pressure chamber 12 of a predetermined greater cross-sectional area than the chamber 8 and from which the low pressure fluid is delivered through a duct 13 into a delivery pipe 14. The sections are clamped together by a plurality of marginally-arranged clamping bolts 15 and the bottom section is additionally clamped to the central section by several lag bolts 16 extending through the bottom and into tapped sockets formed in the central section in proximity to the high pressure chamber 8.

The bottom of the high pressure chamber is closed by a flexible diaphragm 17, the margin of which rests upon an annular shoulder 18 formed in the bottom 6 and leakage around the diaphragm is precluded by a gasket 19 lying against the margin of the diaphragm, the gasket and diaphragm being firmly clamped, upon tightening of the bolts 15 and 16, between the shoulder 18 and an opposed shoulder 21.

The low pressure chamber 12 is similarly closed at its top by a flexible diaphragm 22 clamped together with a gasket 23 between shoulders 24 and 25 formed on the central and top sections respectively.

The diaphragm 17 is centrally perforated to permit the insertion therethrough of a threaded stud 26 carried by a guiding member 27 and adapted to be threaded into the yoke 28 disposed in the chamber 8. A gasket 29 interposed between the members 27 and 28 ensures against leakage through the diaphragm around the stud 26. The guiding member 27 includes a tubular extension 31 slidingly fitted within a recess formed in the bottom member 6 and an upward tension is exerted on the diaphragm 17 by a coiled expansion spring 32 disposed within the tubular extension 31 and interposed between the closed upper end thereof and an abutment member 33 which is supported upon the tapered inner end of a stem 34 threaded into the lower end of the casing, as indicated at 35, and equipped outside the casing with an adjusting wheel 36. The tension upon the spring 32 may be regulated by adjusting the position of the abutment 33 through manipulation of the handwheel.

The diaphragm 22 is similarly centrally perforated to receive the threaded stud 37 carried by a socketed head 38 disposed within the chamber 12 and adapted to be threaded into the tapped head 39 of a guiding member disposed above the diaphragm 22. The diaphragm is clamped between the heads 38 and 39, a gasket 41 being employed to obviate leakage around the stud 37. The guiding member comprises a tubular extension 42, similar to the guiding extension 31 previously described, and slidingly fits within a recessed portion of the top 7. An expansion spring 43 interposed between the head 39 and an adjustable abutment 44 imposes a tension upon the diaphragm 22 which may be regulated by adjustment of the threaded stem 45 which carries the adjusting handwheel 46.

The form of valve proper, illustrated in Fig. 1, comprises a hollow tubular stem 47 provided with spaced radially extending ports 48 and 49, the ports 48 of which, when the valve is depressed, register with the ducts 51 formed in the web of the central section of the casing. The upper end of the valve proper extends into the socket in the head 38 to which it is secured by a pin 52. The lower end of the valve is provided with a head 53 having an annular groove 54 adapted to receive the inwardly projecting fingers of the yoke 28 by means of which the valve is connected to the yoke. In order to obviate lost motion at this point, the stud 26 is preferably of sufficient length to engage the lower end of the head 53 so that the head is clamped between the stud and the fingers of the yoke, as shown in Fig. 1. When the valve is closed, as illustrated, the upper face of the head 53 seats against an annular seat 55 so that communication between the chambers 8 and 12 is completely shut off. Upon lowering movement of the valve, the head is withdrawn from the seat, and when ports 49 are exposed to the chamber 8, ports 48 will be registered with the ducts 51, thereby establishing communication through ports 49, the bore of the valve 47, ports 48 and the ducts 51, between the high pressure chamber 8 and the low pressure chamber 12, permitting a flow from the high pressure to the low pressure side of the valve.

In the modified form illustrated in Fig. 2, the web of the central section of the casing is provided with a removable seat 56 and a solid valve stem 57 is employed which is of less diameter than the port 58 through which it extends, so that flow through said port around the stem is permitted when the valve proper 59 is moved downwardly away from its seat.

In the operation of my invention, the fluid under high pressure enters the chamber 8 and exerts a downward thrust upon the diaphragm 17, which is opposed by the spring 32 and the pressure in the chamber 12 exerted upwardly on the diaphragm 22. Since the area of diaphragm 22 is several times as great as that of the diaphragm 17, it will be manifest that the valve will not open until the pressure in chamber 8 exceeds by predetermined amount the pressure in the chamber 12. When, however, a sufficient differential of pressures has been established in the two chambers, the valve will be drawn downwardly permitting a flow of fluid from the high pressure to the low pressure chamber until the pressure upon diaphragm 22 is sufficient to lift the same and thereby close the valve.

While the general ratio between the pressure in the high and low pressure chambers is determined by the relative sizes of the diaphragms, the opening and closing movements of the valve may be further regulated by manipulation of the handwheels 36 and 46 to adjust the tension of the springs 32 and 43. The double adjustment provides for a very fine regulation of the apparatus, with the result that its operation is extremely delicate, as well as accurate, and only slight variations in pressure beyond the predetermined ratios are required to effect the opening and closing movements of the valve.

It should be observed that no moving parts project beyond the valve casing, and since the adjustable parts are disposed outside the diaphragms which in themselves serve as seals, no packing glands or forms of stuffing boxes are required. The valve is positively actuated and controlled by two diaphragms, and both diaphragms as well as the valve are guided in their movements by guiding members of relatively large areas so that wear is reduced to a minimum and cramping or binding of the diaphragms, as well as the valve, are eliminated.

It is believed that my invention, its construction, mode of operation, and many of its inherent advantages will be understood and appreciated from the foregoing without further description, and it should be manifest that the details of construction illustrated and described are capable of considerable modification and variation without departure from the essence of the invention as defined in the following claims.

I claim:

1. A valve, comprising a casing provided with high pressure and low pressure chambers and with a port connecting said chambers, differential diaphragms disposed in the chambers, respectively, a valve extending through said port and connected with both diaphragms whereby the flow through said port is controlled from the diaphragms, a guiding member attached to the outer face of each diaphragm, said guiding members being slidably disposed in guide-ways formed in the casing, a regulating spring arranged within each guiding member, and abutment against which the outer end of each spring abuts, and means operable from outside the casing for adjusting said abutments to regulate the action of each spring upon its respective diaphragm.

2. In a valve, the combination of a casing provided with high pressure and low pressure chambers, a diaphragm in each chamber, a valve connected with each diaphragm and adapted to control communication between said chambers, and means in alignment with said valve and disposed on the opposite sides of said diaphragms from said valve for maintaining alignment of said diaphragms and valve during operative movements thereof.

3. In a valve, the combination of a casing provided with high pressure and low pressure chambers, a diaphragm in each chamber, a connection between said diaphragms, including a valve adapted to control communication between said chambers, and manually adjustable means whereby movements of said diaphragms and valve in either direction may be controlled.

4. In a valve, the combination of a casing provided with high pressure and low pressure chambers, a diaphragm in each chamber, a connection between said diaphragms, including a valve for controlling communication between said chambers, a guiding member secured to the outer face of each diaphragm, a spring within each guiding member for resisting outward movements of each diaphragm, and adjustable means for independently regulating the tension of said respective springs.

5. In a valve, the combination of a casing, comprising a central section recessed on opposite faces to provide high and low pressure chambers and having an opening between said chambers, and outer sections secured to said central section and enclosing said chambers, a diaphragm clamped between each of said outer sections and said central section, a valve connected to both of said diaphragms and adapted to close said opening, a guiding member secured to the outer face of each diaphragm, a spring acting upon each of said guiding members, and manual means for independently adjusting the tension of each spring.

6. In a valve, the combination of a casing provided with high pressure and low pressure chambers connected by a port, a valve adapted to close said port, a diaphragm sealing each chamber, each diaphragm being connected with said valve, a guiding member connected to the outer face of each diaphragm, said guiding members being disposed entirely within said casing, and means for regulating the pressure ratios at which said valve will open and close, said means including an adjusting member for each diaphragm accessible from outside of the casing.

7. In a valve, the combination of a casing, comprising a central section formed to provide high and low pressure chambers connected by a port and inlet and delivery ducts connected with the chambers respectively, and outer sections secured to said central section, a diaphragm and a gasket clamped between said central section and each of said outer sections, a valve connected to both of said diaphragms and positioned to control said port, and means disposed entirely within the casing and connected with said diaphragms on the sides opposite from said valve for guiding said diaphragms and valve.

8. A valve, comprising a casing provided with high pressure and low pressure chambers and with a port connecting said chambers, differential diaphragms disposed in the respective chambers and so proportioned that the area of the low pressure diaphragm balances the area of the high pressure diaphragm, and a valve extending through said port and connected with both diaphragms, whereby the valve is normally maintained in a floating position by and between the said diaphragms.

JUSTUS C. GOOSMANN.